(No Model.)

J. PORTEOUS.
VINEYARD WEED CUTTER.

No. 362,227.             Patented May 3, 1887.

Witnesses,
Geo. H. Strong
J. H. Nourse

Inventor,
James Porteous
By Dewey & Co.
attys

UNITED STATES PATENT OFFICE.

JAMES PORTEOUS, OF FRESNO, CALIFORNIA.

VINEYARD WEED-CUTTER.

SPECIFICATION forming part of Letters Patent No. 362,227, dated May 3, 1887.

Application filed January 21, 1887. Serial No. 225,039. (No model.)

*To all whom it may concern:*

Be it known that I, JAMES PORTEOUS, of Fresno, in the county of Fresno and State of California, have invented an Improvement in Vineyard Weed-Cutters; and I hereby declare the following to be a full, clear, and exact description thereof.

My invention relates to that class of agricultural implements which are employed for cutting weeds, and which have a flattened V-shaped blade or knife adapted to travel under the surface of the ground, thereby cutting off the weeds.

The object of my invention is to provide an implement which, by reason of its peculiar general construction, is well adapted for use in vineyards, where the low overhanging and spreading tendrils and other vegetation of the vines prevent any ordinary cultivator or weed-cutter from working close to the stems or stocks of the vines and eradicating the weeds from their proximity.

My invention consists in an implement the entire frame-work of which is narrowed down to a minimum, and carrying a V-shaped blade or knife, the wings of which project far enough on each side of the narrow frame-work to reach under the vines and near to the stems or stocks, the frame-work, by reason of its position and construction, avoiding the tops, as I shall hereinafter fully describe.

Figure 1:
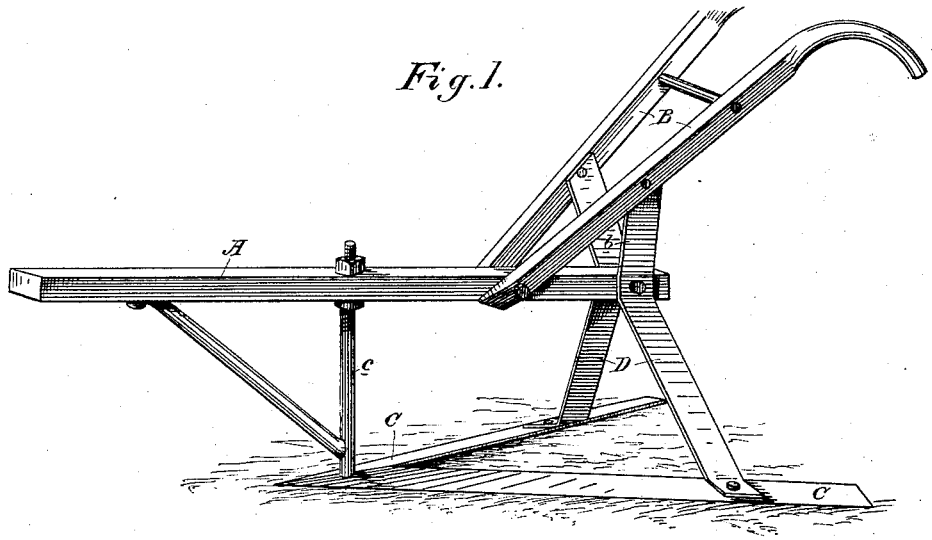
Figure 2:
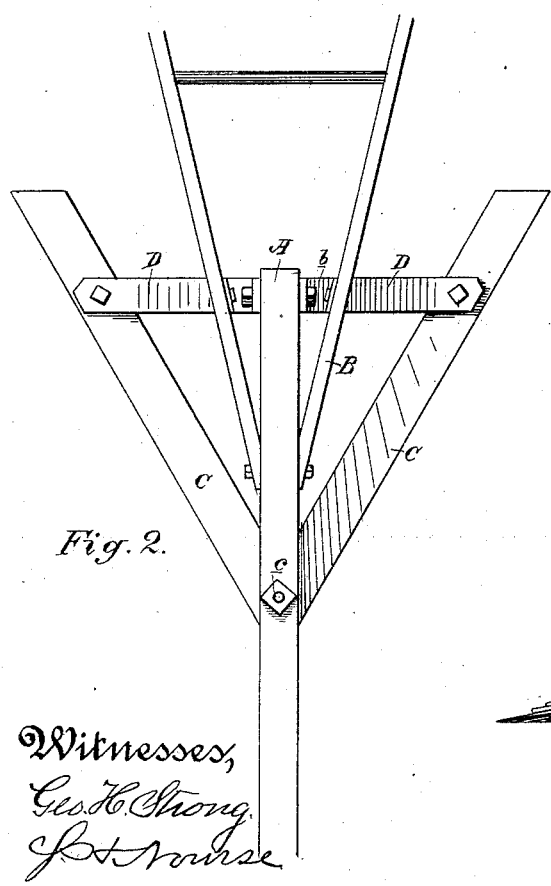
Figure 3:
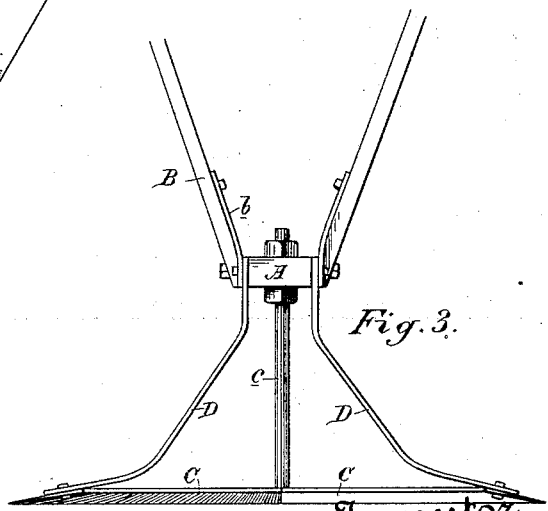

Referring to the accompanying drawings, Figure 1 is a perspective view of my weed-cutter. Fig. 2 is a top view of same. Fig. 3 is a rear view.

A is a beam.

B are the handles connected therewith and having braces *b*.

C is the V-shaped blade, cutter, or knife, connected with the beam by the standard *c* and the inclined braces D. These braces, it will be observed by reference to Fig. 3, vary but little at their lower ends from a horizontal, so that they do not attain much height until well in toward the center of the implement. This throws most of the width of the implement low down and enables the wings of the V-shaped cutter to reach under the vines without interference from the frame-work.

It will be seen, also, that the entire frame-work of the implement is narrowed to the greatest possible extent, the single beam contributing to this result, thereby, as seen in Fig. 2, permitting the greatest projection of the wings of the V-shaped blade.

The upper ends of the braces D need not necessarily be connected with the beam directly, as they may extend even more nearly to the horizontal and be connected with a portion extending down from the beam, or they may be connected with the handles. This connection is immaterial, the object being to obtain a simple narrow frame-work, in order to allow for the greatest projection of the blade-wings to each side.

I am aware of the fact that weed-cutters are known which employ a V-shaped blade; but in these machines, as they are used in open ground, the frame-work is of a different character, there being no necessity for the extreme projection of the blade-wings, such as I show.

Having thus described my invention, what I claim as new, and desire to secure by Letters Patent, is—

A vineyard weed-cutter consisting of the single central beam, A, the handles B, the V-shaped blade, cutter, or knife C, secured in front to the beam, and the inclined braces D, connecting the wings of the blade, cutter, or knife with the frame-work, substantially as described.

In witness whereof I have hereunto set my hand.

JAMES PORTEOUS.

Witnesses:
S. H. NOURSE,
H. C. LEE.